(12) United States Patent
December et al.

(10) Patent No.: US 8,940,822 B2
(45) Date of Patent: Jan. 27, 2015

(54) ADHESION PROMOTER AND COATING COMPOSITION FOR ADHESION TO OLEFINIC SUBSTRATES

(71) Applicant: BASF Coatings GmbH, Muenster (DE)

(72) Inventors: Timothy S. December, Rochester Hills, MI (US); William Merritt, Ferndale, MI (US)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 13/862,511

(22) Filed: Apr. 15, 2013

(65) Prior Publication Data

US 2013/0230662 A1    Sep. 5, 2013

Related U.S. Application Data

(62) Division of application No. 12/554,102, filed on Sep. 4, 2009, now Pat. No. 8,466,218.

(51) Int. Cl.

| | |
|---|---|
| C04B 24/22 | (2006.01) |
| C09D 129/02 | (2006.01) |
| C09D 5/00 | (2006.01) |
| C09D 133/06 | (2006.01) |
| C09J 133/06 | (2006.01) |
| C08L 23/28 | (2006.01) |

(52) U.S. Cl.
CPC ............. *C09D 129/02* (2013.01); *C09D 5/002* (2013.01); *C09D 133/06* (2013.01); *C09J 133/066* (2013.01); *C08L 23/283* (2013.01)
USPC ........................... 524/247; 524/504; 524/505

(58) Field of Classification Search
CPC .... C09D 5/002; C09D 129/02; C09D 133/06; C09J 133/006; C08L 23/283; C08L 2666/02
USPC .......................................... 524/247, 504, 505
See application file for complete search history.

(56) References Cited

U.S. PATENT DOCUMENTS

2005/0131151 A1 *  6/2005  Menovcik et al. ............ 525/191

FOREIGN PATENT DOCUMENTS

| WO | 9301244 A1 | 1/1993 |
|---|---|---|
| WO | 9712935 A1 | 4/1997 |

* cited by examiner

*Primary Examiner* — Peter D Mulcahy

(57) ABSTRACT

A method of improving the transfer efficiency of applying a topcoat layer to a primed component includes applying an organic solventborne, carboxyl functional olefin based polymer composition to a substrate to provide a primed component before electrostatically applying a coating composition comprising principal resin and crosslinker to the primed component to form a topcoat layer, wherein the carboxyl functional olefin based polymer is neutralized with at least one amine-containing compound to form a salted carboxyl functional polymer.

3 Claims, No Drawings

US 8,940,822 B2

ADHESION PROMOTER AND COATING COMPOSITION FOR ADHESION TO OLEFINIC SUBSTRATES

This application is a divisional of U.S. patent application Ser. No. 12/554,102, filed Sep. 4, 2009, which is hereby incorporated by reference in its entirety.

FIELD

This present disclosure relates to adhesion promoters and curable coating compositions, especially compositions that are applied over olefinic substrates such as thermoplastic polyolefin (TPO); and a method of making the coatings.

BACKGROUND

Adhesion additives are known throughout the automotive coatings industry. Adhesion additives are often used as components in primer surfacers, or other intermediate coating compositions, to promote adhesion between a substrate and a topcoat system for an automobile, such as a topcoat system including a flexible basecoat and flexible clearcoat. In general, plastic substrates may be coated with curable, or thermosettable, coating compositions. Color-plus-clear composite coatings have been particularly useful as topcoats for which exceptional gloss, depth of color, distinctness of image, or special metallic effects are desired.

As largely used in primer surfacers, adhesion additives are typically solvent-borne primer surfacers, but may also be used in water-borne primer surfacers, that are applied to a bumper, i.e., facie, or other trim component as the substrate. Typically, these substrates are made up of thermoplastic polyolefin (TPO), and without the inclusion of an adhesion copolymer in an intermediate solvent-borne primer surfacer layer, the topcoat system may delaminate from the TPO substrate.

One kind of adhesion additive includes olefin-based based polymers or copolymers that have an olefin block that is substantially saturated and at least one (poly)ester or (poly) ether block. The olefin-based block polymer or copolymer is typically present in an organic solvent such as xylene, toluene, and the like. The individual components of the adhesion copolymers, i.e., the olefin-based polymer or block copolymer, frequently settle out into the organic solvent. This settling renders the adhesion composition unstable, i.e., having poor shelf stability, and therefore not suitable for use as a component of a solvent borne primer.

It has been found that the conductivity of wet paint and dry film coatings influences the transfer efficiency of adhesion promoters and topcoats, respectively. In order to obtain high transfer efficiency of an adhesion promoter on a typical plastic component with a very high resistivity, large amounts of polar solvents, often in an amount from about 5 to 25% based on formula weight, have typically been used to adjust the conductivity.

It is desirable to provide a coating composition without the addition of large amounts of polar solvents, that yet has a more stable adhesion promoter component of the coating composition that provides improved physical properties, including improved adhesion under harsh testing conditions and improved conductivity to allow for more efficient electrostatic spray applications.

SUMMARY

The present disclosure provides an adhesion promoting composition that includes an olefin based polymer or block copolymer, or a mixture of these, having at least one amine containing compound in addition to other adhesion promoting functional groups that do not react with a principal resin or crosslinking resin in a coating composition. The present disclosure also provides a coating composition containing the adhesion promoter.

In various embodiments, the amine containing compound is selected from the group consisting of dimethylaminoethanol and aminomethylpropanol. The amine containing compound is typically present in an amount from about 1% to about 2% by weight based on total vehicle weight. The olefin-based polymer may include a carboxyl functional adhesion copolymer and at least one functional group selected from the group consisting of hydroxyl, thiol, amide, carbamate, urea, acid, phenol, and combinations thereof. The olefin-based polymer is typically present in an amount from about 0.01% to about 30% by weight based on total vehicle weight.

Coating compositions used with the adhesion promoter of the present disclosure may provide a wet paint resistivity of less than about 1.5 Mohms, or less than about 1 Mohms. The coating compositions may provide a dry film resistivity of less than about 0.02 Mohms, or less than about 0.01 Mohms.

Methods for preparing the adhesion promoter and the coating containing the adhesion additive are also provided. A method of improving the transfer efficiency of a topcoat layer to a primed component includes applying a carboxyl functional olefin based polymer composition to a substrate to provide a primed component and electrostatically applying a coating composition comprising principal resin and crosslinker to the primed component to form a topcoat layer. The carboxyl functional polymer is neutralized with at least one amine containing compound to form a salted carboxyl functional polymer. Additionally, in certain embodiments, the amine containing compound may be used as a catalyst in the formation of the coating composition.

DETAILED DESCRIPTION

The following description is merely exemplary in nature and is in no way intended to limit the disclosure, its application, or uses.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value. As used throughout, ranges are used as a short hand for describing each and every value that is within the range. Any value within the range may be selected as the terminus of the range.

Adhesion promoters are typically solventborne adhesion promoting primers that are designed to be applied over a plastic substrate, such as TPO, to provide a primer layer between the plastic substrate and a topcoat layer. As is known in the art, adhesion promoters help to improve the adhesion of the topcoat to the plastic. The present disclosure provides an adhesion promoting composition that includes an olefin-based polymer or block copolymer, or a mixture of these, including at least one amine group containing compound in addition to other adhesion promoting functional groups that do not react with a principal resin or crosslinking resin in a coating composition. As used herein, the term "principal resin" is used with reference to the main resin(s) that may provide film forming aspects. In certain instances, the principal resin may be the resin present in the largest amount. The adhesion promoter of the present disclosure preferably includes at least one carboxyl functional adhesion promoting polymer. A small amount of the amine may be provided to internally salt the adhesion promoting polymer. By neutralizing the carboxyl groups of the polymer with an amine to form a salt, it has been found that the resistivity of a composition containing the neutralized polymer is lowered due to the high conductivity of the salt (as compared with a composition coating the un-salted carboxyl polymer).

More specifically, it has been found that the addition of the amine improves (i.e., lowers) both the wet paint resistivity and the dry film resistivity. Lower wet paint resistivity provides a higher transfer efficiency of the adhesion promoter to a part via an electrostatic spray application. Lower dry film resistivity improves the transfer efficiency of the topcoat layer to a plastic part for a more efficient painting process. With the adhesion promoter of the present disclosure, large amounts of polar solvents may not have to be used to adjust the conductivity, leading to more stable coating formulations. Additionally, it has been found that the amine-containing compound may be used as a catalyst in the formation of the coating composition layer. As a non-limiting example, when used with a two-component urethane topcoat, the amine could volatize from the adhesion promoter or primer layer and serve as a catalyst for an isocyanate-alcohol reaction in curing the topcoat layer.

The adhesion promoter of the present disclosure may comprise at least one olefin-based polymer or copolymer having a functionality thereon that is substantially non-reactive with the film forming components of a coating composition when subjected to curing conditions. The olefin-based polymer or copolymer of the invention may be prepared from saturated or substantially saturated polyolefin preferably having a number average molecular weight of from about 1,000 up to about 5,000, more preferably from about 1,000 up to about 3,500, and even more preferably from about 1,500 up to about 3,500. The adhesion promoter is used in a coating to promote adhesion to a substrate, preferably a TPO substrate. As used herein, the olefin based adhesion promoter refers to both the olefin based polymer and olefin based block copolymer.

The olefin-based polymer may be produced by hydrogenation of a polyfunctional polydiene polymer. The polydiene polymer may have any functional group that is an active hydrogen donor, or a group that is converted to an active hydrogen donor and is not reactive with functionality on a principal or crosslinking resin in a coating composition containing the olefin based polymer. Polycarboxylated and polyhydroxylated polydiene polymers can most easily utilized due to their commercial availability. Polyhydroxylated polydiene polymers may be produced by anionic polymerization of monomers such as isoprene or butadiene and capping the polymerization product with alkylene oxide and methanol, as described in U.S. Pat. Nos. 4,039,593, 5,376,745, 5,486,570, and Reissue 27,145, each of which is incorporated herein by reference in their entirety. The polyhydroxylated polydiene polymer is substantially saturated by hydrogenation of the double bonds that is at least 90 percent, preferably at least 95% and even more preferably essentially 100% complete to form the hydroxyl-functional olefin polymer. The hydroxyl equivalent weight of the hydroxyl-functional saturated olefin polymer may be from about 500 to about 20,000. The hydroxy functional olefin-based polymer thus prepared is then reacted with a compound reactive with the hydroxyl functionality to provide a functionality that is non-reactive with a principal resin or crosslinking resin in a coating composition. Such non-reactive functionality includes thiol, acid, epoxy and hydrogen donor and/or acceptor functionality.

Alternatively, the olefin-based polymer may comprise a block copolymer that has an olefin block and at least one (poly)ester, (poly)urethane or (poly)ether block. By the terms "(poly)ester block" "(poly)urethane block" and (poly)ether block" it is meant that the base polyolefin material is modified with one or more monomer units through formation of, respectively, ester, urethane or ether linkages. For purposes of the present disclosure, "(poly)ester block" has a special meaning that, in the case of two or more monomer units, the monomer units are predominantly, preferably exclusively, arranged in head-to-tail linkages.

The olefin-based polymer may be prepared by reacting a hydroxyl-functional, saturated or substantially saturated olefin polymer with a chain-extension reagent that is reactive with hydroxyl groups and will polymerize in a head-to-tail arrangement of monomer units. Such chain-extension reagents include, without limitation, lactones, hydroxy carboxylic acids, oxirane-functional materials such as alkylene oxides, and combinations of these. Examples of chain-extension reagents are lactones and alkylene oxides. Specific examples of these include $\epsilon$ caprolactone, ethylene oxide, and propylene oxide. The hydroxy groups on the olefin-based block polymer thus formed are in turn reacted with a compound to provide adhesion-promoting functional groups that do not react with a principal resin or a crosslinking resin of a coating composition.

Preferably, the block polymer has one block of the olefin material to which is attached one or more of the (poly)ester, (poly)urethane and/or (poly)ether blocks. In one embodiment, the olefin-based block copolymer of the disclosure may be represented by a structure selected from $A-[B-F_n)]_m$ and $A-F_n$ in which A represents an olefin block, B represents a (poly)ester, (poly)urethane or (poly)ether block or combinations thereof, F is a functional group that does not react with a principal resin or crosslinker in the coating composition and m is on average from about 0.7 to about 10, alternatively from about 1.7 to about 2.2 or from about 1.9 to about 2, and n is on average from 2 to 4.

The A block may be a saturated or substantially saturated olefin polymer. In one embodiment, the A block is substantially linear. In general, about 15% or less of the carbons of the A block should be pendant to the olefin polymer backbone. Preferably 10% or less, more preferably 8% or less of the carbons of the A block should be pendant to the olefin polymer backbone. Each B block preferably may contain, on average, from about 0.5 to about 25 monomer units, more preferably on average from about 2 to about 10, and even more preferably on average from about 2 to about 6 monomer units per hydroxyl group of the unmodified olefin block. The monomer units may be the same or there may be different monomer units in a single (poly)ester, (poly)urethane or (poly)ether block. For example, a (poly)ether block may have one or more ethylene oxide units and one or more propylene oxide units.

In both the olefin polymer and block copolymer, the hydroxyl-functional olefin polymer utilized is preferably a hydroxyl-functional hydrogenated polymer of butadiene with ethylene, propylene, 1,2 butene, and combinations of these. The olefin polymers may have a number average molecular weight of preferably from about 1,000 to about 10,000, more preferably from about 1,000 to about 5,000, even more preferably from about 1,000 up to about 3,500, and still more preferably from about 1,500 up to about 3,500. The olefin polymer also preferably has at least one hydroxyl group on average per molecule. The olefin polymer may have from about 0.7 to about 10 hydroxyl groups on average per molecule, more preferably from about 1.7 to about 2.2 hydroxyl groups on average per molecule, and still more preferably about 2 hydroxyl groups on average per molecule. The hydroxyl-functional olefin polymer may have terminal hydroxyl groups and a hydroxyl equivalent weight of from about 1,000 to about 3,000. Molecular weight polydispersities of less than about 1.2, particularly about 1.1 or less, are preferred for these materials.

The olefin polymer is preferably a low molecular weight poly(ethylene/butylene) polymer having at least one hydroxyl group. In another embodiment, the polyolefin polyol is a hydrogenated polybutadiene. Such hydrogenated polyolefin polyols are those available under the trademark POLYTAIL™ from Mitsubishi Chemical Corporation, Specialty Chemicals Company, Tokyo, Japan, including POLYTAIL™ H.

In one embodiment, a block copolymer is formed from the hydroxy-functional olefin polymer by reaction with a lactone or a hydroxy carboxylic acid to form an olefin-based polymer having (poly)ester end blocks. Lactones that may be ring opened by an active hydrogen are well-known in the art. Examples of suitable lactones include, without limitation, ε-caprolactone, γ-caprolactone, β-butyrolactone, β-propriolactone, γ-butyrolactone, α-methylα-butyrolactone, β-methyl-γ-butyrolactone, γ-valerolactone, δ-valerolactone, γ-decanolactone, δ-decanolactone, γ-nonanoic lactone, γ-octanoic lactone, and combinations of these.

The lactone ring-opening reaction is typically conducted under elevated temperature (e.g., 80-150° C.). When the reactants are liquids a solvent is not necessary. However, a solvent may be useful in promoting good conditions for the reaction even when the reactants are liquid. Any non-reactive solvent may be used, including both polar and nonpolar organic solvents. Examples of useful solvents include, without limitation, Solvesso 100 (a mixed hydrocarbon solvent), Solvesso 150, (mixed hydrocarbon solvent), naptha, methyl propyl ketone, methyl ethyl ketone, methyl isobutyl ketone toluene, xylene, and the like and combinations of such solvents. A catalyst may be utilized. Useful catalysts include, without limitation, proton acids (e.g., octanoic acid, Amberlyst® 15 (Rohm & Haas)), and tin catalysts (e.g., stannous octoate). Alternatively, the reaction may be initiated by forming a sodium salt of the hydroxyl group on the molecules that will react with the lactone ring.

A hydroxy carboxylic acid can also be used instead of a lactone or in combination with a lactone as the compound that reacts with the hydroxyl-functional olefin polymer to provide ester blocks. Useful hydroxy carboxylic acids include, without limitation, dimethylhydroxypropionic acid, hydroxy stearic acid, tartaric acid, lactic acid, 2-hydroxyethyl benzoic acid, N-(2-hydroxyethyl)ethylene diamine triacetic acid, and combinations of these.

The reaction may be conducted under typical esterification conditions, for example at temperatures from room temperature up to about 150° C., and with catalysts such as, for example, calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid. The reaction may also be conducted at room temperature with a polymer-supported catalyst such as Amerlyst-15® (available from Rohm & Haas).

While polyester segments may likewise be produced with dihydroxy and dicarboxylic acid compounds, it may be preferred to avoid such compounds because of the tendency of reactions involving these compounds to increase the polydispersity of the resulting block copolymer. If used, these compounds should be used in limited amounts and preferably employed only after the lactone or hydroxy carboxylic acid reactants have fully reacted.

The reaction with the lactone or hydroxy carboxylic acid or oxirane compounds adds at least one monomer unit as the B block and preferably provides chain extension of the olefin polymer. In particular, the (poly)ester and/or (poly)ether block is thought to affect the polarity and effective reactivity of the end group functionality during curing of the coating.

The (poly)ester and/or (poly)ether block also makes the olefin-based block copolymer more compatible with components of a typical curable coating composition. The amount of the extension depends upon the moles of the alkylene oxide, lactone, and/or hydroxy carboxylic acid available for reaction. The relative amounts of the olefin polymer and the alkylene oxide, lactone, and/or hydroxy acid may be varied to control the degree of chain extension. The reaction of the lactone ring, oxirane ring, and/or hydroxy carboxylic acid with a hydroxyl group results in the formation of an ether or ester and a new resulting hydroxyl group that can then react with another available monomer, thus providing the desired chain extension. In the present disclosure, the equivalents of oxirane, lactone, and/or hydroxy carboxylic acid for each equivalent of hydroxyl on the olefin polymer are from about 0.5 to about 25, or from about 1 to about 10, or from about 2 to about 6. In a specific embodiment about 2.5 equivalents of lactone are reacted for each equivalent of hydroxyl on the olefin polymer.

In another embodiment of the disclosure, a polyolefin having terminal hydroxyl groups is reacted with an oxirane-containing compound to produce (poly)ether endblocks. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The hydroxyl group of the olefin-based polymer functions as initiator for the base-catalyzed alkylene oxide polymerization. The polymerization may be carried out, for example, by charging the hydroxyl-terminated olefin polymer and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran polymerizes under known conditions to form repeating units [$CH_2CH_2CH_2CH_2O$]—. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment may be prepared as a "living polymer" and terminated by reaction with the hydroxyl group of the olefin polymer.

The non-reactive functionality on either type of polyolefin polymer may be provided for example by reacting the hydroxyl functionality on the olefin polymer with an anhydride functional compound to provide an acid functionality. Suitable anhydride functional compounds include cyclic anhydrides derived from polycarboxylic acids wherein at least two of the acid groups are located beta or gamma (1,2 or 1,3) to form the cyclic anhydride though a dehydration reaction yielding the cyclic anhydride and water. The cyclic anhydride may also include other acid groups or halogen groups or aliphatic, olinic (unsaturated carbon chains), cycloaliphatic or aromatic side groups of chain lengths between 1 and 18 carbons. These must not interfere with formation of the cyclic anhydride. Examples of these include trimelaic anhydride, hexahyrophthalic, phthalic anhydride, tetrahydrophthallic anhydride, hexahydrophthalic anhydride, methyl hexahydrophthalic anhydride, maleic anhydride, succinic anhydride, glutaric anhydride, 2-dodecen-1-ylsuccinic anhydride, and dodecenylsuccinic anhydride. Mixtures of anhydrides may also be used. Thiol functionality may be obtained by forming a polyolefin halide and then reacting the halide with sodium hydrogen sulfide.

In another embodiment, a hydroxy functional olefin polymer may be reacted with an isocyanate functional pre-polymer. The isocyanate functional pre-polymer may be made by the reaction of a polyfunctional isocyanate with less than a stochiometric amount of a difunctional chain extension material having functional groups selected from the group consisting of polyols, polyamines, hydroxy amines and combinations thereof. Alternatively, or in addition, the polyfunctional isocyanate may be reacted with one or more capping agents that comprise a hydroxy or an amine group and an additional functional group that is essentially inert to the isocyanate under the reaction conditions. The amount of capping agent used must be less than the stochiometric amount of available isocyanate. To prevent unwanted molecular weight growth and/or gellation, the polyisocyanates such as diisocyanates including, but not limited to isophorone diisocyanate, hexane diisocyanate, toluene diisocyanate are effective. In most cases, the chain extension agents will be difunctional. Non-limiting examples of chain extension agents are 2-ethyl-hexane-1,3-diol, 1,6-hexanediamine, and 6-amino-hexane-1-ol. These chain extension agents may be extended prior to reaction with the polyisocyanate. A non-limiting example is the reaction of 1,6-hexanediol with a lactone. Non-limiting examples of capping agents are hydroxy alkyl carbamates such as hydroxy propyl carbamate, 1-hydroxy-pentanoic acid and 1-hydroxy-butyl amide. These capping agents may be extended by reaction with lactones.

The olefin-based polymer of the adhesion promoter may be used in a coating composition in an amount from between about 0.01 and about 30% by weight based on the total vehicle weight. Alternatively, the adhesion promoter polymer may be used in an amount from between about 3 to about 30% by weight, or between about 5 and about 20% by weight based on total vehicle weight. "Vehicle," as used herein, is understood to be the resinous and polymer components of the coating composition, which includes film forming resins and polymers, crosslinkers, other reactive components such as the olefin-based block copolymer, the chlorinated polyolefin, and other reactive or nonreactive resinous or polymeric components such as acrylic microgels.

While not intending to be bound by theory, it is believed that the mechanism that results in adhesion of the coating to the substrate involves a migration of the olefin-based polymer or block copolymer to the olefinic or TPO substrate interface and an interaction with the olefinic or TPO substrate. It is believed that the migration and/or interaction is facilitated by application of heat, such as the heat applied to cure the coating composition. It is thought that the non-reactivity of the functional groups on the olefin-based polymer or copolymer toward the principal resin and crosslinker leaves the functionality available to provide adhesion between the coating and the olefinic or TPO substrate. It is believed that the hydrogen donor/acceptor nature of the groups enhances the adhesive properties of the substituted polyolefin polymer. Since the groups are essentially inert to reaction with a principal resin or a crosslinking resin in a coating composition, the groups remain essentially unreacted and in tact in the final coating system. By "essentially unreacted" or "essentially inert", is meant that only trace amounts or less than 8% and preferably less than 1% of the functional groups may react with principal resin or crosslinker.

The coating compositions of the disclosure may contain a wide variety of film-forming resins. At least one crosslinkable resin is typically included. The resin may be self-crosslinking, but typically a coating composition includes one or more crosslinking agents reactive with the functional groups on the film-forming resin. Film-forming resins for coating compositions typically have such functional groups as, for example, without limitation, hydroxyl, carboxyl, carbamate, urea, epoxide (oxirane), primary or secondary amine, amido, thiol, silane, and so on and combinations of these. The film-forming resin may be any of those used in coating compositions including, without limitation, acrylic polymers, vinyl polymers, polyurethanes, polyesters (including alkyds), polyethers, epoxies, and combinations and graft copolymers of these. Also included are polymers in which one kind of polymer is used as a monomer in forming another, such as a polyester-polyurethane, acrylic-polyurethane, or a polyether-polyurethane in which a dihydroxy functional polyester, acrylic polymer, or polyether is used as a monomer in the urethane polymerization reaction. Useful film-forming resins include acrylic, polyurethane and polyester polymers, including alkyds and mixtures of any of these. Useful acrylic resins include those having a hydroxyl number of between 95 and 225. In the case of waterborne compositions, the film-forming resin is emulsified or dispersed in the water. In one embodiment, a waterborne coating composition includes both a polyurethane and an acrylic resin. Many references describe film-forming polymers for curable coating compositions and so these materials do not need to be described in further detail here.

Film-forming resins may be included in amounts of from about 5 to about 99%, preferably from about 20 to about 80% of the total solid vehicle of the coating composition.

When the coating composition includes a curing agent, or crosslinker, the crosslinker is non-reactive with the olefin-based polymer or block copolymer under normal curing conditions. The curing agent has, on average, at least about two crosslinking functional groups. Suitable curing agents include, without limitation, materials having active methylol or methylalkoxy groups, such as aminoplast crosslinking agents or phenol/formaldehyde adducts, curing agents that have isocyanate groups, particularly blocked isocyanate curing agents; curing agents having epoxide groups; and combinations of these. Examples of specific curing agent compounds include melamine formaldehyde resins (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), and combinations of these. Unblocked polyisocyanate curing agents are usually formulated in two-package (2K) compositions, in which the curing agent and the film-forming polymer (in this case, at least the block copolymer) are mixed only shortly before application and because the mixture has a relatively short pot life. The curing agent may be combinations of these, particularly combinations that include aminoplast crosslinking agents. Aminoplast resins include melamine formaldehyde resins or urea formaldehyde resins.

In various embodiments of the present disclosure, an amine may be used as a catalyst for the coating layer. For example, in the case of a two component urethane topcoat, an amine can volatize and provide a catalyst for the R—NCO+R'—OH reaction. The amine salt of this polymer could also be used to salt the polymer into water and form a waterborn adhesion copolymer. In various embodiments, an amine containing compound for the present disclosure is selected from the group consisting of dimethylaminoethanol and aminomethylpropanol. The amine containing compound is typically present in an amount from about 1% to about 2% by weight based on total vehicle weight.

The functionality on the olefin-based polymeric adhesion promoter functionality is preferably selected so that it is not reactive with functional groups on either the principal resin or crosslinker in the coating composition. The functionality may be selected from the group consisting of hydroxyl, acid, thiol, carbamate, urea, amine, phenol and amide groups and mixtures thereof, depending on its inertness to the functionality of the principal resin and crosslinker.

For example, where an isocyanate crosslinker or resin is used with a hydroxyl functional resin, the functional group on the adhesion promoter may be selected from the group consisting of amides, phenol, carbamates, acid and mixtures thereof. The functional group on the olefin-based adhesion promoter may be obtained for example, by reacting a hydroxyl functional olefinic polymer produced by hydrogenation of a polyhydroxylated polydiene polymer with a compound to provide acid, thiol, carbamate, urea, amine phenol, or amide functionality that does not react with the hydroxyl functionality on the principal resin or the isocyanate functionality on the crosslinker.

For example, when an epoxy functional principal resin and acid crosslinker or acid functional principal resin with epoxy crosslinker, or an ultraviolet radiation curable principal resin and crosslinker are used, the functionality on the adhesion promoter may be selected from the group consisting of alcohols, amides, carbamates, phenol and urea and mixtures thereof.

Aminoplast resins such as melamine formaldehyde resins or urea formaldehyde resins are specific example of crosslinkers for resins having hydroxyl, carbamate, and/or urea functional groups. Where the crosslinker is aminoplast, the functionality on the adhesion promoter is acid or thiol.

A coating composition comprising the olefin-based polymer or block copolymer adhesion promoter may further include other components, including and without limitation for example, chlorinated polyolefin, additional adhesion promoters, catalysts suitable for reaction of the particular crosslinker, solvents including water and organic solvents, surfactants, stabilizers, matting agents, wetting agents, rheology control agents, dispersing agents, adhesion promoters, pigments, fillers, uv absorbers, hindered amine light stabilizers, silicone additives, customary coatings additives, and combinations of these. Suitable pigments and fillers include, without limitation, conductive pigments, including conductive carbon black pigments and conductive titanium dioxide pigments; non-conductive titanium dioxide and carbon pigments, graphite, magnesium silicate, ferric oxide, aluminum silicate, barium sulfate, aluminum phosphomolybdate, aluminum pigments, and color pigments. The pigments and, optionally, fillers are typically included at a pigment to binder ratio of from about 0.1 to about 0.6, preferably from about 0.1 to about 0.25.

The adhesion promoter olefin-based polymer of the disclosure may be applied directly to a substrate or combined with a chlorinated polyolefin adhesion promoter for direct application to a substrate, or the olefin-based polymer may be used as a component of a coating composition. The adhesion promoter is particularly useful for olefinic substrates such as TPO to provide excellent adhesion of subsequent coating layers to the substrates. Use of the olefin polymer improves coating performance following gasoline immersion testing.

Where the adhesion promoter olefin-based polymer is combined with a chlorinated polyolefin good adhesion following exposure to humidity testing is obtained. Some non-limiting examples of chlorinated polyolefins may be found in U.S. Pat. Nos. 4,683,264; 5,102,944; and 5,319,032. Chlorinated polyolefins are known in the art and are commercially available form various companies, including Nippon Paper, Tokyo, Japan, under the designation Superchlon; Eastman Chemical Company, Kingsport, Tenn. under the designation CPO; and Toyo Kasei Kogyo Company, Ltd., Osaka, Japan under the designation Hardlen. Examples of non-chlorinated adhesion promoters include AP-550-1 from Eastman Chemical.

The coating compositions of the disclosure may comprise chlorinated polyolefin in an amount between 0 and about 25% by weight, and in some embodiments between about 0.001% and about 25% by weight, or between about 1.0 and 15.0% by weight, or between 1.0 and 10.0% by weight, based on total vehicle weight.

In one embodiment, the coating comprises only a solution or dispersion that includes only or essentially only the olefin-based block copolymer and chlorinated polyolefin as the vehicle components. In this embodiment, it is preferred to first apply the adhesion promoter directly to the, plastic substrate and then to apply a layer of a coating composition. Applying coating layers "wet-on-wet" is well known in the art.

For this embodiment of the adhesion promoter, the applied adhesion promoter may be either coated "wet on wet" with one or more coating compositions and then all layers cured together, or the adhesion promoter layer may be partially or fully cured before being coated with any additional coating layers. Curing under any of these conditions allows subsequent coating layer(s) to be applied electrostatically when the adhesion promoter is utilized with or without conductive pigments, for example as conductive carbon black or conductive titanium dioxide, according to methods known in the art.

The use of the adhesion promoter polymer or copolymer of the present disclosure increases the conductivity of the primer system and reduces the amount used or eliminates the conductive pigment used in the coating composition. Improved conductivity increases topcoat transfer efficiency in electrostatic spray systems.

Curing the adhesion promoter layer before applying an additional coating layer may allow the subsequent coating layer to be applied electrostatically when the adhesion promoter is formulated with a conductive pigment such as conductive carbon black or conductive titanium dioxide, according to methods known in the art.

The adhesion promoter polymer may be added to a variety of coating compositions to produce coating compositions that have excellent adhesion to plastic substrates, particularly to olefinic substrates, including TPO. Compositions in which the combination of the polymeric adhesion promoter may be used include primers, one-layer topcoats, basecoats, and clearcoats.

The adhesion promoter or coating composition used in the practice of the disclosure may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the disclosure include Lewis acids, zinc salts, and tin salts.

A solvent may optionally be included in the adhesion promoter or coating composition used in the practice of the present disclosure, and preferably at least one solvent is included. In general, the solvent may be any organic solvent and/or water. It is possible to use one or more of a broad variety of organic solvents. The organic solvent or solvents are selected according to the usual methods and with the usual considerations. In the present disclosure, the solvent is present in the coating composition in an amount of from about 0.01 weight percent to about 99 weight percent. Typically, in organic solventborne compositions solvent is present from about 5 weight percent to about 70 weight percent, and for topcoat compositions from about 10 weight percent to about 50 weight percent. In a preferred embodiment, the coating has less than 4% HAPS.

In another embodiment, the solvent is water or a mixture of water with any of the typical co-solvents employed in aqueous dispersions. When the olefin-block copolymer is to be used in a waterborne composition, it is advantageous to include in the block copolymer at least one polyethylene oxide segment or ionizable group to aid in dispersing the material. When modified with a polyethylene oxide segment or ionizable group, the block copolymer of the disclosure may be dispersed in water, optionally with other components (crosslinkers, additives, etc.) and then applied as an adhesion promoter or added to an aqueous coating composition as an aqueous dispersion of the block copolymer. Alternatively, the block copolymer may be blended with the film-forming polymer and then dispersed in water along with the film-forming polymer. In the latter method, it is contemplated that the block copolymer need not be modified with a hydrophilic segment, and instead the affinity of the block copolymer for the film-forming vehicle may be relied upon to maintain the components in a stable dispersion.

The coating compositions of the disclosure may be formulated as either one-component (one-package or 1K) or two-component (two-package or 2K) compositions, as is known in the art.

The adhesion promoter and coating compositions may be coated on an article by any of a number of techniques well-known in the art. These include, without limitation, spray coating, dip coating, roll coating, curtain coating, and the like. Spray coating is preferred for automotive vehicles or other large parts.

The adhesion promoter and optionally chlorinated polyolefin may be added to a topcoat coating composition in amounts that do not substantially alter the gloss of the topcoat. In one application, for example, the olefin-based block copolymer is utilized in a topcoat composition that produces a high-gloss cured coating, preferably having a 20° gloss (ASTM D523-89) or DOI (ASTM E430-91) of at least 80 that would be suitable for exterior automotive components.

In another application, the olefin-based block copolymer may be included in a topcoat or primer composition that produces a low gloss coating, such as for coating certain automotive trim pieces. Typical low gloss coatings have a gloss of less than about 30 at a 60° angle. The low gloss may be achieved by including one or more flatting agents. Low gloss primer compositions are often used to coat automotive trim pieces, such as in a gray or black coating. The low gloss primer is preferably a weatherable composition because the low gloss primer may be the only coating applied to such trim pieces. In the case of a weatherable primer, the resins are formulated to be light-fast and the composition may include the usual light stabilizer additives, such as hindered amine light stabilizers, UV absorbers, and antioxidants.

When the coating composition of the disclosure is used as a high-gloss pigmented paint coating, the pigment may include any organic or inorganic compounds or colored materials, fillers, metallic or other inorganic flake materials such as mica or aluminum flake, and other materials of kind that the art normally names as pigments. Pigments are usually used in the composition in an amount of 0.2% to 200%, based on the total solid weight of binder components (i.e., a pigment-to-binder ratio of 0.02 to 2). As previously mentioned, adhesion promoters preferably include at least one conductive pigment such as conductive carbon black pigment, conductive titanium dioxide, conductive graphite, conductive silica-based pigment, conductive mica-based pigment, conductive antimony pigment, aluminum pigment, or combinations of these, in an amount that makes the coating produced suitable for electrostatic applications of further coating layers.

The adhesion promoters and coating compositions may be applied at thicknesses that will produce dry film or cured film thicknesses typical of the art, such as from about 0.01 to about 5.0 mils. Typical thicknesses for adhesion promoter layers are from about 0.1 to about 0.5 mils, preferably from about 0.2 to about 0.4 mils. Typical thicknesses for primer layers are from about 0.5 to about 2.0 mils, preferably from about 0.7 to about 1.5 mils. Typical thicknesses for basecoat layers are from about 0.2 to about 2.0 mils, preferably from about 0.5 to about 1.5 mils. Typical thicknesses for clearcoat layers or one-layer topcoats are from about 0.5 to about 3.0 mils, preferably from about 1.5 to about 2.5 mils.

After application to the substrate, the adhesion promoters and coating compositions of the disclosure may be heated to facilitate interaction with the substrate and thus to develop the adhesion of the applied composition to the substrate. Preferably, the coated substrate is heated to at least about the softening temperature of the plastic substrate. The adhesion promoters and coating compositions are preferably thermally cured. Curing temperatures will vary depending on the particular blocking groups used in the crosslinking agents, however they generally range between 160° F. and 270° F. The curing temperature profile must be controlled to prevent warping or deformation of the TPO substrate or other plastic substrate. The first compounds according to the present disclosure are preferably reactive even at relatively low cure temperatures. Thus, in a one embodiment, the cure temperature is preferably between 225° F. and 270° F., and in another embodiment at temperatures no higher than about 265° F. The curing time will vary depending on the particular components used, and physical parameters such as the thickness of the layers, however, typical curing times range from 15 to 60 minutes, and preferably 20-35 minutes. The curing conditions depend upon the specific coating composition and substrate, and may be discovered by straightforward testing.

The coating compositions of the disclosure are particularly suited to coating olefinic substrates, including, without limitation, TPO substrates, polyethylene substrates, and polypropylene substrates. The coating compositions may also be used, however, to coat other thermoplastic and thermoset substrates, including, without limitation, polycarbonate, polyurethane, and flexible substrates like EPDM rubber or thermoplastic elastomers. Such substrates may be formed by any of the processes known in the art, for example, without limitation, injection molding and reaction injection molding, compression molding, extrusion, and thermoforming techniques.

The materials and processes of the disclosure may be used to form a wide variety of coated articles, including, without limitation, appliance parts, exterior automotive parts and trim pieces, and interior automotive parts and trim pieces.

The disclosure is further described in the following examples. These examples are merely illustrative and do not in any way limit the scope of the disclosure as described and claimed.

EXAMPLES

A control coating composition is prepared having the following formulation as shown in Table 1; these values are provided prior to the addition of the amines and other additives. The weight percentages are provided as the non-volatile content of the coating composition. All parts are parts by weight unless otherwise noted.

TABLE 1

| Component | Quantity | Weight Percent (non-volatile) |
|---|---|---|
| Acrylic resin | 58.20 | 24.29 |
| Dow Trifunctional Polyester (e.g., polycaprolactone material) | 26.90 | 22.46 |
| Melamine | 5.25 | 4.39 |
| Polyolefin (modified) | 86.50 | 14.44 |
| Conductive carbon black pigment | 5.89 | 4.90 |
| $TiO_2$ white pigment | 23.57 | 19.67 |
| Conductive carbon black pigment | 3.93 | 3.28 |
| Fumed silica | 7.86 | 6.60 |
| Aromatic 100 solvent | 92.40 | — |
| Methyl propyl ketone | 36.30 | — |
| Ethanol | 8.00 | — |
| Aromatic 150 solvent | 45.00 | — |
| Acid Catalyst | 0.22 | 0.10 |
| Total | 400.00 | 100.00 |

Additional coating compositions are prepared according to the control formulation as shown in Table 1 that further include either 1% or 2% by weight of dimethylaminoethanol (DMEA) or aminomethylpropanol (AMP) as listed in Tables 2 and 3. An addition of about 1% by weight of the amine containing compound provides about 90% neutralization, while the addition of about 2% by weight of the amine containing compound provides about 180% neutralization. Coating compositions are prepared by mixing material together and milling to an appropriate particle size. Wet paint resistivity is recorded as set forth in Table 2. Preferably, the coating compositions with such an adhesion promoter provide a wet paint resistivity of less than about 1.5 Mohms, and more preferably less than about 1 Mohm. Coatings are then applied to a TPO substrate and dry film resistivity is evaluated as set forth in Table 3. Preferably, the coating compositions with such an adhesion promoter provide a dry film resistivity of less than about 0.02 Mohms, and more preferably less than about 0.01 Mohms.

TABLE 2

| | Amine/Acid % Neutralization | Wet Paint Resistivity (Mohms) |
|---|---|---|
| Control (without amine) | 0% | 5.1 |
| Adhesion Promoter with 1% DMEA | 90% | 1.4 |
| Adhesion Promoter with 2% DMEA | 180% | 0.9 |
| Adhesion Promoter with 1% AMP | 90% | 0.7 |
| Adhesion Promoter with 2% AMP | 180% | 0.4 |

TABLE 3

| | Amine/Acid % Neutralization | Dry Film Resistivity (Mohms) |
|---|---|---|
| Control (without amine) | 0% | 0.03 |
| Adhesion Promoter with 2% DMEA | 180% | 0.015 |
| Adhesion Promoter with 2% AMP | 180% | 0.01 |

As represented by the above data, the addition of a small amount of dimethylaminoethanol and/or aminomethylpropanol dramatically improves the paint wet resistivity and the dry film resistivity. Such an improvement in the wet paint resistivity enhances the transfer efficiency of the adhesion promoter to a plastic part, while an improvement in the dry film resistivity enhances the transfer efficiency of the topcoat to the primed part. Additionally, if properly formulated, the amine containing compound may be used as a catalyst in the formation of the coating composition layer. For example, in a two-component urethane topcoat, the amine could volatize and serve as a catalyst for the R—NCO (isocyanate)+R'—OH (alcohol) reaction.

The disclosure has been described in detail with reference to various embodiments thereof. It should be understood, however, that variations and modifications may be made within the spirit and scope of the disclosure.

What is claimed is:

1. A method of improving the transfer efficiency of applying a topcoat layer to a primed component, the method comprising:
    applying an organic solventborne, carboxyl functional olefin based polymer composition to a substrate to provide a primed component, and
    electrostatically applying a coating composition comprising principal resin and crosslinker to the primed component to form a topcoat layer,
    wherein the carboxyl functional olefin based polymer is neutralized with at least one amine-containing compound to form a salted carboxyl functional polymer, wherein the amine-containing compound is selected from the group consisting of dimethylaminoethanol, aminomethylpropanol, and combinations thereof.

2. A method according to claim 1, comprising using the amine-containing compound as a catalyst in the formation of the coating composition.

3. A method according to claim 1, wherein the amine-containing compound is present in an amount between about 1% to about 2% by weight based on total vehicle weight.

* * * * *